United States Patent

Nichols

[15] 3,692,373
[45] Sept. 19, 1972

[54] SLIPPER BEARING LUBRICATION AND SEAL

[72] Inventor: Kenneth E. Nichols, Arvada, Colo.

[73] Assignee: The Gates Rubber Company, Denver, Colo.

[22] Filed: June 22, 1971

[21] Appl. No.: 155,496

[52] U.S. Cl.................................308/36.3, 30/73
[51] Int. Cl.........................F16c 33/72, F16c 17/03
[58] Field of Search............................308/73, 36.3

[56] References Cited

UNITED STATES PATENTS 2,222,307   11/1940   Blood.........................308/73

Primary Examiner—Edgar W. Geoghegan
Assistant Examiner—Frank Susko
Attorney—Raymond Fink et al.

[57] ABSTRACT

A lubrication system and dynamic seal for floating slipper bearings including a lubricant pumping means responsive to rotation of a shaft supported by the bearings, a lubricant flow restriction communicating with the pumping means and a cavity that retains the bearings, and optionally, a second pumping means for raising lubricant pressure to the bearings.

6 Claims, 2 Drawing Figures

INVENTOR
KENNETH E. NICHOLS
BY H H Oberg Jr
ATTORNEY

SLIPPER BEARING LUBRICATION AND SEAL

BACKGROUND OF THE INVENTION

The invention relates to distributed weight bearings of the combined radial and thrust type, but more particularly, the invention relates to a lubrication and dynamic sealing system for floating slipper bearings.

Slipper bearings are film lubricated bearings wherein a plurality of slipper pads are located in annular series around and in support of a rotating shaft. The bearings are advantageously used in applications involving: high rotational speeds of many thousand revolutions per minute; thin lubricating films; self alignment; and some dynamic unbalance. The bearings may be of the radial or combination radial - thrust type. Examples of such bearings are disclosed in U.S. Pat. No. 1,534,788 as issued to A.G.M. Michell et al, and U.S. Pat. No. 1,860,932 as issued to Hill.

While slipper bearings have been advantageously used to solve many problems, they inherently introduce problems of lubrication and sealing in some applications. The bearings are rotated at a fraction of the speed of a shaft supported by the bearings. Typically, prior art lubricating systems meter lubricant flow to the bearings. The bearing motion induces a pumping action that dispels the lubricant to a scavenging system. High lubricant flow through the bearings results in large power consumption by the bearings. While a high power loss may be tolerable in some high power machinery applications, a high power loss may result in a low operating efficiency in small machinery applications. The pressure rise of the lubricant exiting the bearings may present lubricant sealing problems, especially in hermetically sealed systems. Also, the present art lubrication systems are not adaptable for use with high vapor pressure lubricants as the pumping action of the bearings may induce lubricant cavitation and consequent bearing failure. This invention is directed toward overcoming lubrication and sealing problems of floating slipper bearings.

SUMMARY OF THE INVENTION

In accordance with the invention, there is provided a floating slipper bearing in combination with a lubricant flow control system or a dynamic seal and lubricant flow control system. A housing portion having a bearing cup or retainer supports a plurality of slipper pads which define a floating slipper bearing. A flanged shaft extends into the housing portion and is radially supported by the bearing. The flange radially extending from the shaft provides a thrust surface adjacent to the slipper pads. Lubricant passageways in or separate from the housing portion direct lubricant to and from the bearing in a controlled manner while a pumping means, formed in part by a portion of the flange, balances the lubricant pressure rise across the bearing to effect a dynamic seal.

Accordingly, it is an object of the invention to provide a dynamic seal system for floating slipper bearings.

Another object of the invention is to provide a sealing arrangement adaptable for use with lubricating systems operating at various pressures.

Still another object of the invention is to provide a lubricating system for floating slipper bearings which controls power loss across the bearings within operable limits.

Another object of the invention is to provide a lubricating control system where high vapor pressure lubricants may be effectively used with bearings of the floating slipper type.

These and other objects or advantages of the invention will become apparent by reviewing the drawings and description thereof wherein.

DESCRIPTION OF PREFERRED EMBODIMENT

Figure 1:
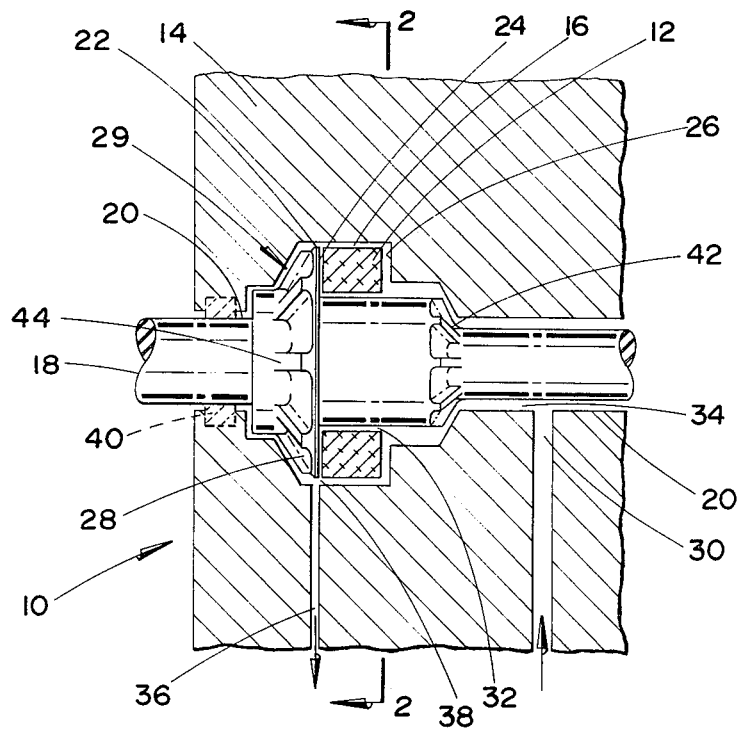
FIG. 1 is a partially cutaway side view of the invention.
Figure 2:
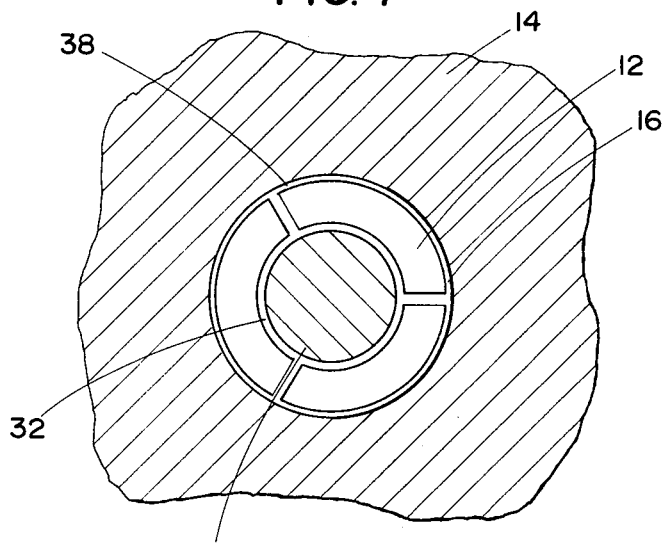
FIG. 2 is a view taken along the line 2—2 of FIG. 1.

Referring to the drawings, a bearing lubricating and sealing system 10 is shown for a floating slipper bearing 12. In accordance with the invention, a housing portion 14 has a bearing cup or retainer 16 for receiving and mounting the floating slipper bearing 12. The housing portion may be that of any desired rotating machinery such as a turbine, compressor, pump, gear box, or the like. A shaft 18 extends into a bore 20 of the housing portion 14 and through the bearing and is radially supported thereby.

In a preferred embodiment that includes the sealing means of the invention, a flange or collar 22 extends from the shaft adjacent to one radial side of the floating slipper bearing 12. One side of the flange defines a face 24 for transmitting or receiving thrust. The housing is formed with a similar face 26 for receiving or transmitting end thrust through the floating slipper bearing in known fashion. On the second side or oppositely facing face of the flange is formed a pump impeller 28. The pump impeller 28 may have any desired shape to provide a desired pumping efficiency or pressure ratio. For example, the second flange face may be: similar to the thrust face; generally frustro-conical; or include vanes. The housing portion 14 extends radially inward and adjacent the pump impeller face 28 of the flange to define a pump housing. Together, the pump housing and flange define a pumping means 29, the purpose of which will be later explained. It should be noted that the pump housing and bearing cup together define a single cavity that is divided by the flange.

The housing portion 14 has or mounts at least two passageways or conduits for directing a fluid lubricant to and from the floating slipper bearing. The passageways may be separate conduits or part of the housing. A first passageway 30 directs a lubricant to the inside diameter 32 of the bearing. In the embodiment shown, the lubricant is directed to the shaft. An annular clearance 34 between the shaft and housing receives the lubricant and directs it to the bearing. It is, of course, understood that the passageway may lead directly to the bearing and that the lubricant need not be direct to the annular clearance. The annular clearance may be considered as merely an extension of the lubricant passageway.

A second passageway 36 directs lubricant flow away from the outside diameter 38 of the bearing. The size of the second passageway is of primary importance as it pertains to the sealing and lubrication aspects of the invention. The second passageway has a pre-determined restriction to inhibit lubricant flow through the bearing while limiting bearing power losses in a manner which will later be explained. Optionally, a static seal 40, shown in dotted form, is provided between the housing portion and shaft to control lubricant leakage past or around the shaft 18 under static conditions.

Referring now to the sealing aspects of the invention, pressurized lubricant enters the first passageway 30 and flows along the annular clearance 34 of the shaft to enter the inside diameter 32 of the bearing. In known manner, the bearing 12 provides both radial and end thrust support to the rotating shaft 18. The rotational motion of the shaft 18 and flange 22 induces the bearings 12 to rotate at a fractional speed of the shaft and increase the lubricant pressure level. The lubricant is pumped to the radial outside diameter 32 of the bearing where it exits through the second passageway 36.

A portion of the lubricant is free to flow to the pumping means 29. The pumping means is designed to have an exit pressure capability that is greater than the maximum expected pressure of the lubricant exiting the floating slipper bearing. However, only a portion of the pumping means pressure capacity is utilized during the sealing mode. Just the amount of pressure is generated that is necessary to balance the lubricant pressure exiting the bearing. Together, the pumping means and bearing coact to define a dynamic seal, the operation of which may best be understood in conjunction with the starting transient of the shaft 18 as it goes from zero to full rotational speed.

When the shaft 18 is at rest, lubricant is free to fill the bearing and the pumping means 29 up to the point of the optional static seal 40. As the shaft 18 is rotated, lubricant flows through the first passageway 30 and to the bearing where the lubricant pressure is increased. For example, the lubricant may enter the inside diameter of the bearing at 40 psia and exit the bearing at 60 psia when the shaft reaches nominal speed. Lubricant exits the bearing through the second passageway 36. Simultaneously, lubricant pressure increases in the pumping means 29 and a small quantity of lubricant is pumped to the second passageway 36. As there is no lubricant feed to the inlet side of the pumping means 29, a somewhat free liquid surface of the lubricant is generated which moves radially outward along the pump impeller face 28. When the pump means is initially full of lubricant, it may have a design pressure rise of 150 psia where the exit pressure is 160 psia. As the free lubricant surface moves up the face of the pump impeller 28, the exit pressure is correspondingly reduced. Movement of the free liquid surface along the impeller stops when the exit pressure of the pumping means just equals the exit pressure of the lubricant from the bearings. That is when both pressures are 60 psia. Should the lubricant pressure from the bearing increase, the free liquid surface moves radially inward to a point where a pressure balance is achieved. In the instant case, the bearing exit pressure could reach 160 psia and a dynamic seal would still be maintained.

After the lubricant has left the area of the static seal under dynamic conditions, the seal 40, obviously, is no longer required. Consequently, the seal may be completely eliminated in some applications. For example, the pumping means may be vented to a compatible area or system such as a lubricant scavenging cavity.

Referring now to the lubrication aspects of the invention, adequate lubrication is maintained when the bearing is flooded with lubricant. As known, bearing power losses increase with increased lubricant flow through the bearing. Prior art uses annular oil baffle rings and annular shoulders or collars adjacent the bearing as a means of limiting lubricant flow. While the baffle rings and shoulders are satisfactory in some applications, for example, in high power machinery, the rings and shoulders are subject to wear which results in less restriction and increased lubricant flow. Also, the annular clearance adjacent the rings and shoulders provides a flow area that is too large for minimum power loss - especially in turbo machinery rated below 10 horsepower.

It has been found that lubricant flow may be controlled by selectively restricting the second passageway by orificing or sizing. The partial housing 14 encompasses the bearing to prevent extraneous leakage from the bearing while the dynamic seal confines lubricant to the bearing. The dynamic seal is not necessary to realize the lubrication ensuing benefits of the flow limiting second passageway as any acceptable shaft seal may be substituted for the static seal 18.

When lubricant flows to the bearing, the lubricant pressure increases as previously explained. The second or discharge passageway 36 restricts flow to a minimum in a manner similar to "dead-heading" a pump. The size of the passageway 15 is selected such that proper lubricant flow is maintained for cooling the bearing. The restricting passageway 36 insures the bearing will be flooded with lubricant. The power loss through the bearing is similar to the power required to drive a pump. Thus, when the lubricant discharge is limited, the power loss of the bearing is maintained at minimum.

Here, the advantages of limiting lubricant flow through the second or discharge passageway 36 should be distinguished from the prior art. If the same restricting size passageway were used to meter lubricant flow to the bearing, the bearing would cavitate because of its pumping characteristics, and fail for lack of lubricant.

Another advantage of controlling lubricant flow from the bearing through a flow limiting passageway or orifice is that it permits usage of high vapor pressure lubricants such as halogenated hydrocarbons including trichloromonofluoromethane, dichlorodifluoromethane, chlorodifluoromethane, dichlorotetrafluoroethane, carbon tetrachloride, trichlorotrifluoroethane, or mixtures thereof. Adequate lubricant pressure is maintained by "throttling" the bearing by means of the flow restricting second passageway.

ADDITIONAL SPECIES

Oftentimes, lubricant pressure varies considerably within a system where the sealing aspects of the invention are desired to be used. It may also be desirable to operate the bearing at a high pressure to preclude vaporization of the lubricant. For example, the bearing inlet pressure may have to be 40 psia to achieve a desired exit pressure of 60 psia at the second passageway. However, the available lubricant pressure in the first passageway may only be 20 psia.

In accordance with the invention, a second pumping means 42 is included on the shaft 18. The second pumping means may be a mere step in the shaft or include vanes. As the shaft is rotated, the second pumping means 42 raises lubricant pressure to a desired level. In the foregoing example, the second pumping means raises the lubricant pressure from 20 psia to 40 psia.

Likewise, the pumping characteristics of the first pumping means 29 may be altered to achieve a desired pressure rise. Vanes 44 may be added to the impeller to achieve a greater differential pressure sealing capability.

The foregoing detailed description is made for purpose of illustration only and is not intended to limit the scope of the invention which is to be determined from the appended claims.

What is claimed is:

1. A floating slipper bearing lubrication control comprising:
    a rotatable shaft;
    a floating slipper bearing encircling and supporting said shaft, said bearing having an inside and outside diameter;
    a housing portion encompassing and retaining said bearing, said housing having a bore that receives said shaft;
    a first lubricant passageway directed to near the inside diameter of said bearing for feeding a lubricant thereto;
    a second lubricant passageway directed from near the outside diameter of said bearing for draining lubricant therefrom, said second passageway having a pre-determined restriction for limiting lubricant flow through the bearing; and
    sealing means for limiting lubricant leakage from said bearing, shaft and housing.

2. A dynamic seal and lubrication control for a floating slipper bearing comprising:
    a flanged rotative shaft, the flange having oppositely facing first and second faces, said second face defining a pump impeller;
    a floating slipper bearing encircling said shaft adjacent the first face of said flange, said bearing capable of pumping to a discharge pressure in response to rotation of said shaft;
    a housing portion encompassing the flange and said bearing and retaining said bearing, said housing having a bore that receives said shaft; and said housing portion in combination with the pump impeller defining a pumping means fluidly communicable with the housing portion that retains said bearing, said pumping means responsive to rotation of the shaft and having a pressure rise capability greater than said bearing;
    a first lubricant passageway directed to near the inside diameter of said bearing for feeding a lubricant thereto; and
    a second lubricant passageway directed from near the flange and outside diameter of said bearing for draining lubricant therefrom, said second passageway having pre-determined restriction for limiting lubricant flow through the bearing;
    whereby in response to rotation of said shaft, said pumping means and bearing define a dynamic seal between said housing and shaft.

3. A dynamic seal and lubrication control as set forth in claim 2 and further including:
    a second pumping means responsive to rotation of said shaft for increasing lubricant pressure level in said first passageway near the inside diameter of said bearing.

4. A dynamic seal and lubrication control as set forth in claim 1 and further including:
    a sealing means for limiting lubricant leakage between said shaft and housing when said shaft is not rotating.

5. A method of dynamically sealing a floating slipper bearing that supports a rotating shaft comprising the steps of:
    supplying a lubricant under pressure to the inside diameter of the bearing;
    increasing the lubricant pressure at the outside diameter of the bearing in response to shaft rotation;
    balancing the lubricant pressure at the outside diameter of the bearing against the discharge of a second pumping means responsive to shaft rotation, the pumping means having a greater pressure rise capability than the lubricant pressure at the outside diameter of the bearing;
    draining the combined flow of lubricant from the bearing and pumping means at the outside diameter of the bearing through a restriction of pre-determined resistance.

6. A dynamic seal for a floating slipper bearing comprising;
    a housing portion having a bore and an annular cavity concentric with the bore;
    a rotative shaft extending into the bore of said housing;
    a flange having oppositely facing first and second faces, the first face defining a bearing thrust surface and the second face defining a pump impeller, said flange extending from said shaft and into said cavity, and the pump impeller in conjunction with said housing defining a pumping means having a pressure rise capability in response to rotation of said shaft;
    a floating slipper bearing disposed within the annular cavity encircling said shaft and adjacent the thrust surface of said flange, said bearing capable of pumping to a discharge pressure in response to rotation of said shaft, the discharge pressure capability of the bearing being less than the pressure rise capability of the pumping means;
    a first lubricant passageway directed to near the inside diameter of the bearing for feeding a lubricant thereto; and
    a second lubricant passageway from near the outside diameter of said bearing and annular cavity for draining lubricant therefrom, said second passageway having pre-determined restriction for limiting lubricant flow through the bearing;
    whereby in response to rotation of said shaft, said pumping means and bearing together define a dynamic seal between said housing and shaft.

* * * * *